US005479087A

United States Patent [19]
Wright

[11] Patent Number: 5,479,087
[45] Date of Patent: Dec. 26, 1995

[54] SYNCHRONIZED SWITCH TAPPED COUPLED INDUCTOR REGULATION CIRCUIT

[75] Inventor: Robert S. Wright, Spring, Tex.

[73] Assignee: Compaq Computer Corp., Houston, Tex.

[21] Appl. No.: 955,693

[22] Filed: Oct. 2, 1992

[51] Int. Cl.[6] .......................... G05F 1/577; H02M 3/335
[52] U.S. Cl. .............................................. 323/267; 363/21
[58] Field of Search ...................................... 323/247, 251, 323/266, 267, 282, 285, 290; 363/18, 19, 20, 21, 22, 23, 24, 25, 26

[56] References Cited

U.S. PATENT DOCUMENTS

| | | | |
|---|---|---|---|
| 4,669,036 | 5/1987 | Cowett | 363/21 |
| 4,677,534 | 6/1987 | Okochi | 363/21 |
| 4,870,555 | 9/1989 | White | 363/21 |
| 4,999,568 | 3/1991 | Gulczynski | 323/266 |
| 5,038,264 | 8/1991 | Steigerwald | 363/21 |
| 5,119,013 | 6/1992 | Sabroff | 323/267 |
| 5,122,728 | 6/1992 | Ashley | 323/267 |
| 5,285,367 | 2/1994 | Keller | 363/21 |
| 5,363,323 | 11/1994 | Lange | 363/21 |
| 5,394,017 | 2/1995 | Catano et al. | 363/21 |

OTHER PUBLICATIONS

R. D. Middlebrook, A Continuous Model for the Tapped–Inductor Boost Converter, Proceedings of the IEEE Power Electronics Specialist Conference, Jun. 9–11, 1975, Culver City, Calif., pp. 55–71.

Primary Examiner—Matthew V. Nguyen
Attorney, Agent, or Firm—Pravel, Hewitt, Kimball & Krieger

[57] ABSTRACT

A synchronized switch tapped coupled inductor circuit which couples a first closed-loop regulated output of a forward converter switching power supply to a second output to assist in regulating the voltage of the second output. The switched power supply includes a converter transformer which is implemented as a forward converter providing the multiple outputs. The second output includes a storage inductor which is coupled to a storage inductor of the first output. The second coupled inductor includes a center tap which is connected to a synchronized switch. The synchronized switch is further connected to the first output and coupled to the converter transformer to detect the forward and flyback portions of each cycle. During the flyback portion of each cycle, the switch is turned on coupling the center tap to the first output. During the forward portion of each cycle, the switch is turned off, isolating the outputs from each other.

8 Claims, 3 Drawing Sheets

SYNCHRONIZED SWITCH TAPPED COUPLED INDUCTOR REGULATION CIRCUIT

BACKGROUND OF THE INVENTION

1. Field of the Invention

The present invention relates to regulating the voltage of a second output of a multiple output forward converter by switchably connecting the second output to a first closed-loop regulated output using a synchronized switch and tapped coupled inductor.

2. Description of the Related Art

Cost and efficiency are almost always major focal points for computer designers, especially designers of personal computer systems. The power supply is receiving an increasing amount of attention where designers are constantly attempting to improve efficiency. Significant advances have been made so that at least the same amount of power or more is being delivered by smaller units. Nonetheless, further improvement is essential to keep pace with the demands of the computer market.

A typical computer system includes many components having different power and voltage requirements, where the components generally include logic circuits, video displays, hard disk and floppy drives as well as keyboards, mouse units, cooling fans and various other components. A switching power supply is preferred for use with a computer system since it provides one of the better known ways to convert a raw AC or DC voltage to several DC voltage levels required for the various components in the computer system. Depending upon the application, DC-to-DC or AC-to-DC switching converters are typically used. Switching DC-to-DC converters convert an unregulated DC voltage, typically from a battery, to the various DC voltage levels required at the outputs. More commonly, a switching AC-to-DC converter is used which first converts AC power to a large unregulated DC voltage using a filter and rectifier circuit, and which then converts the unregulated DC voltage to the various required regulated DC voltage levels through a converter transformer. The current through the primary of the converter transformer is usually controlled by a pulse width modulator (PWM) circuit. Although several types of converters are known, such as forward and flyback converters, the present invention concerns forward converters.

Some of the outputs of a power supply for a computer are required to be regulated at relatively tight tolerances, while other outputs require less regulation and may vary significantly more. For example, a 5 volt output usually provides power for the logic circuitry, which circuitry generates logic signals having information content, so that very little noise content is tolerated. The 5 volt supply, therefore, is usually designed with feedback circuitry implementing sophisticated regulation techniques to maintain the voltage level at 5 volts within specified tight tolerance levels under various load conditions.

Several outputs of the power supply are used to provide raw power to devices such as fans and disk drive motors, which can tolerate greater voltage variances so that the output requires less regulation. For example, a 12 volt output is typically provided to power electric motors used in disk and floppy drives as well as cooling fans. Less sophisticated regulation techniques are used for the 12 volt supply and usually involves open-loop control. Although the 5 volt supply is generally connected to a roughly constant load, the load applied to the 12 volt supply is relatively erratic, and varies from no load at all to sudden large loads drawing large surge currents, such as when electric motors are initially activated. Specifications usually allow wider tolerances during surge conditions. It is noted that regulation of the 12 volt supply is less problematic under average or even surge load conditions. However, regulation becomes more difficult when little or no load is applied since the voltage tends to float above the highest voltage level allowed by the specifications, which is undesirable because it could damage some of the electronic devices connected to the output. Since low-load and even no-load conditions of the 12 volt supply are common, some form of regulation circuit is necessary to keep the voltage level within specification. There have been several regulation circuits which have been used. Most of these regulators exhibit undesirable characteristics, however, such as inefficiency and excessive cost due to relatively expensive regulation components or relatively high parts count and complexity.

FIGS. 1A–1D illustrate some prior art methods which have been used to regulate an open loop output of a forward converter switching power supply. The simplest method is to provide an output preload or bleed resistor 34 across the output so that a load is always provided. An output preload regulator 20 is shown in FIG. 1A, which is a forward converter generally including a primary circuit 21 coupled to a primary coil 22 of a converter transformer T, where the transformer T also includes a secondary coil 24. The dotted terminal of the secondary coil 24 is coupled to the anode of a forward diode 26 and the undotted terminal of the secondary coil 24 provides the 12 volt return signal, referred to as 12 V RTN. A diode 28 has its anode connected to the 12 V RTN signal and its cathode connected to the cathode of the diode 26. A coupled storage inductor 30 has one terminal connected to the cathodes of the diodes 26 and 28 and its other terminal providing the 12 volt output signal, referred to as 12 V. A load capacitor 32 is coupled between the 12 V and the 12 V RTN signals.

It is noted that the output preload regulator 20 only shows one output leg or portion of a multiple output switching power supply, where each output provides a different voltage level. Each output is preferably implemented as a forward converter and includes an output series storage inductor, such as the coupled storage inductor 30, which is used to store energy. All of the storage inductors of all outputs are typically wound around a single magnetic core in forward converters, which is the reason the storage inductor 30 is referred to as being "coupled."

In general, the primary circuit 21 is preferably a pulse-width modulated (PWM) switching circuit, which causes current to flow into the dotted terminal of the primary coil 22 during the forward portion of each cycle. The primary current causes current to flow from the dotted terminal of the secondary coil 24 through the forward diode 26 and through the storage inductor 30 charging the capacitor 32 and providing power to a load (not shown) coupled between the 12 V and 12 V RTN signals. Energy is also stored in the storage inductor 30. The primary circuit 21 then switches off for the remaining period of time of each cycle, referred to as the flyback portion of the cycle, which stops current flow through the primary and secondary coils 22 and 24 of the transformer T. This forward biases the diode 28 and current flows through the inductor 30, the capacitor 32 and the diode 28.

The transformer T, the values of the storage inductor 30 and the capacitor 32 are chosen to provide approximately 12 volts, where the inductor 30 and the capacitor 32 also serve to filter the output voltage of the 12 volt supply. If the load resistor 34 were not provided and no external load were present, the capacitor 32 would continue to charge to levels above 12 volts and above specified levels, which is undesirable. The load resistor 34 prevents the capacitor 32 from overcharging and roughly maintains regulation at the desired 12 volt level under various load conditions. A significant disadvantage of the output preload regulator 20 of FIG. 1A, however, is that the load resistor 34 wastes valuable power by converting a significant amount of power into heat. This creates a relatively inefficient design and also raises the internal temperature of the power supply.

FIG. 1B illustrates a magnetic amplifier regulator 36 which is another prior art method. Similar components as those in FIG. 1A are indicated using identical reference designators. The primary circuit 21 and converter transformer T1 are not shown for purposes of simplicity, yet the magnetic amplifier regulator 36 is also a forward converter which operates in a very similar manner as the output preload regulator 20. A magnetic amplifier inductor 38 is added which has one terminal coupled to the dotted terminal of the secondary coil 24 and has its other terminal coupled to the anode of the diode 26. An error amplifier and drive circuit 40 receives a nominal reference DC voltage signal, referred to as BIAS, and is coupled to and monitors the 12 V signal. The error amplifier and drive circuit 40 provides an output signal to the anode of the diode 26. A load resistor 42 is also provided between the 12 V signal and the 12 V RTN signal, which usually has a higher resistance than the resistor 34 and thus consumes less power than the resistor 34. The magnetic amplifier regulator 36 method provides good regulation using "feedback" control through operation of the error amplifier and drive circuit 40 to maintain the output voltage within a specified voltage range under most load conditions. This method is very costly, however, due to the added magnetic inductor 38, and also suffers from a very high parts count due to the member of parts required to implement the error amplifier and drive circuit 40. Circuitry must also be provided to generate the BIAS reference signal.

FIG. 1C illustrates another prior art method called a buck switch regulator 44. In the buck switch regulator 44, an error amplifier and drive switch rectifier 46 is coupled to the 12 V RTN signal and to the junction between the inductor 30 and the capacitor 32, which provides an input signal. The error amplifier and drive switch rectifier 46 receives and monitors the 12 V signal as feedback and provides an output signal to an added LC filter stage. The LC filter stage comprises a capacitor 50 coupled between the 12 V signal and the 12 V RTN signal, and an inductor iron 48 which receives the output signal of the error amplifier and drive switch rectifier 46 at one terminal and provides the 12 V signal at its other terminal. The buck switch regulator 44 also regulates the output voltage well, but is more sophisticated than the magnetic amplifier regulator 36 of FIG. 1B, and thus is even more costly, having an even greater parts count.

Finally, FIG. 1D illustrates another 12 volt supply 52 according to yet another prior art technique, which uses a 3-terminal regulator 54. The 3-terminal regulator has its input connected to the inductor 30, its output providing the 12 V signal and its adjust terminal coupled to the 12 V RTN signal. Another capacitor 56 is coupled between the 12 V signal and the 12 V RTN signal. The 3-terminal regulator 54 could be the LM317 manufactured by National Semiconductor, or could be another common type of 3-terminal regulator. This technique also regulates well but suffers from relatively low efficiency. Its cost is not excessive but is still significant.

It is therefore desirable to provide a low cost, highly efficient regulation circuit to regulate one of the relatively low regulated outputs of a forward converter switching power supply, such as the 12 volt output, without a significant number of additional parts.

SUMMARY OF THE PRESENT INVENTION

It is recognized that a forward converter switching power supply for a computer system typically provides multiple outputs including a closed-loop tightly regulated output, which is usually the 5 volt supply. A synchronized switch tapped coupled inductor circuit according to the present invention couples a second less regulated output to the closed-loop output during the flyback portion of the forward converter, and isolates the outputs during the forward portion of each cycle.

The switched power supply preferably includes a converter transformer having a primary coil, where the current through the primary coil is controlled by a pulse width modulation (PWM) circuit. The secondary of the converter transformer is coupled to two output legs or regulators for providing a first and a second output, where each leg includes a forward rectifier and an LC storage filter. The first and second outputs include coupled storage inductors which are preferably coupled on the same core, so that the inductor of the first output controls the voltage across the inductor of the second output. The PWM circuit is controlled by an error amplifier feedback loop coupled to the first output.

The second storage inductor also includes a center tap connected to one side of a synchronized switch, where the other side of the synchronized switch is connected to the first output. The synchronized switch is coupled to the converter transformer to detect the forward and flyback cycles of the switched power supply. The synchronized switch could alternatively be connected to the output of the forward converter of the second output, or in any other manner satisfactory to detect the change from forward to flyback. The synchronized switch turns on during the flyback cycle, which couples the center tap to the first output. This essentially couples the load and feedback circuit of the first output to the second output through the center tapped storage inductor, thereby providing further regulation of the second output. The synchronized switch turns off during the forward cycle thereby isolating the outputs from each other.

In the preferred embodiment, the second output may also be directly coupled to the feedback loop through a summing junction. Feedback signals from both outputs are summed together to provide the feedback signal to the PWM circuit. The first output preferably provides a higher percentage of the feedback signal since it has tighter regulation specifications and must be the dominant controller.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1A:
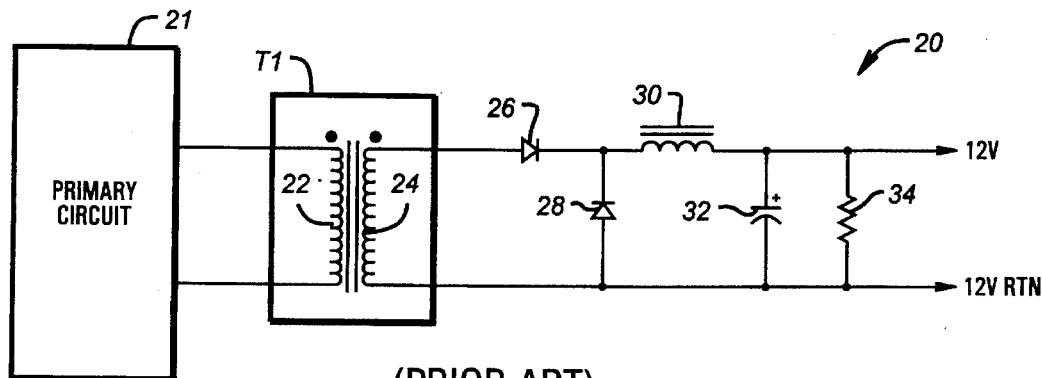
FIGS. 1A–1D are schematic diagrams illustrating prior art techniques for regulating the output of a twelve volt forward converter.
Figure 1B:
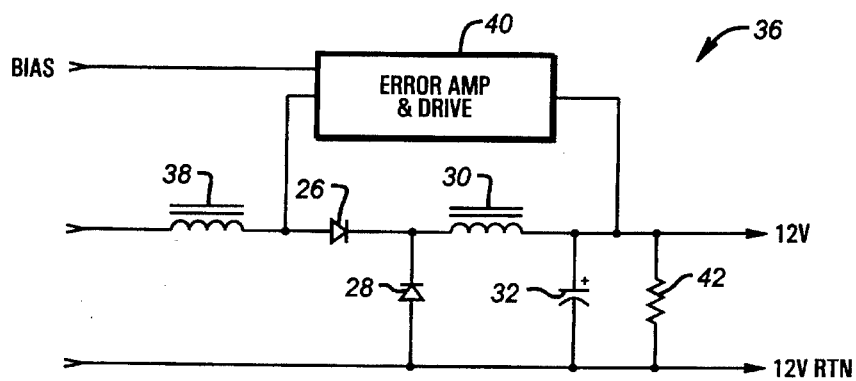
Figure 1C:
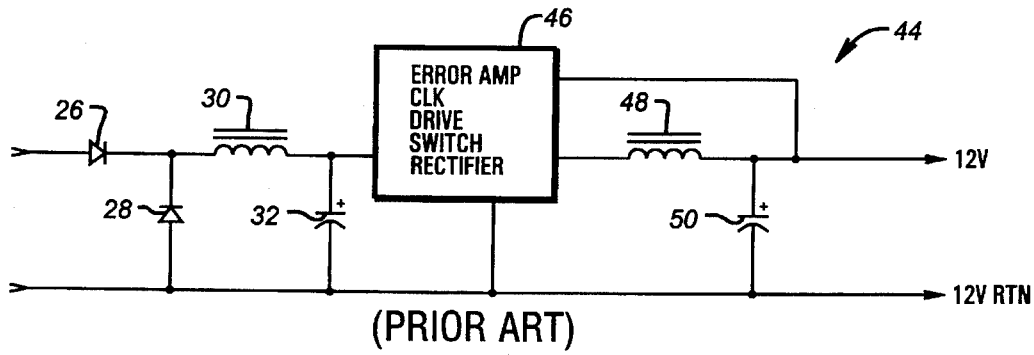
Figure 1D:
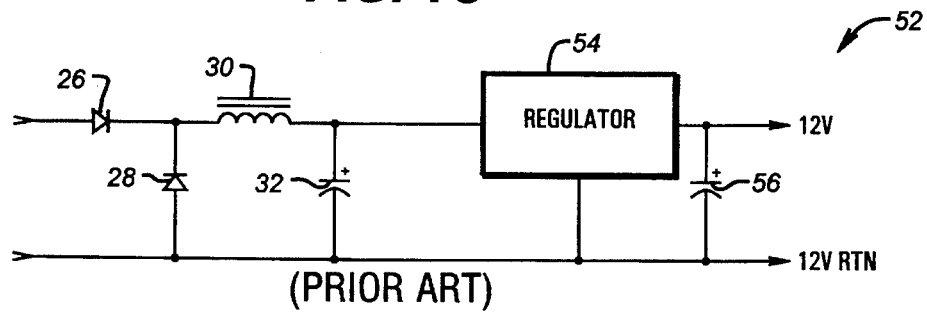
Figure 2:
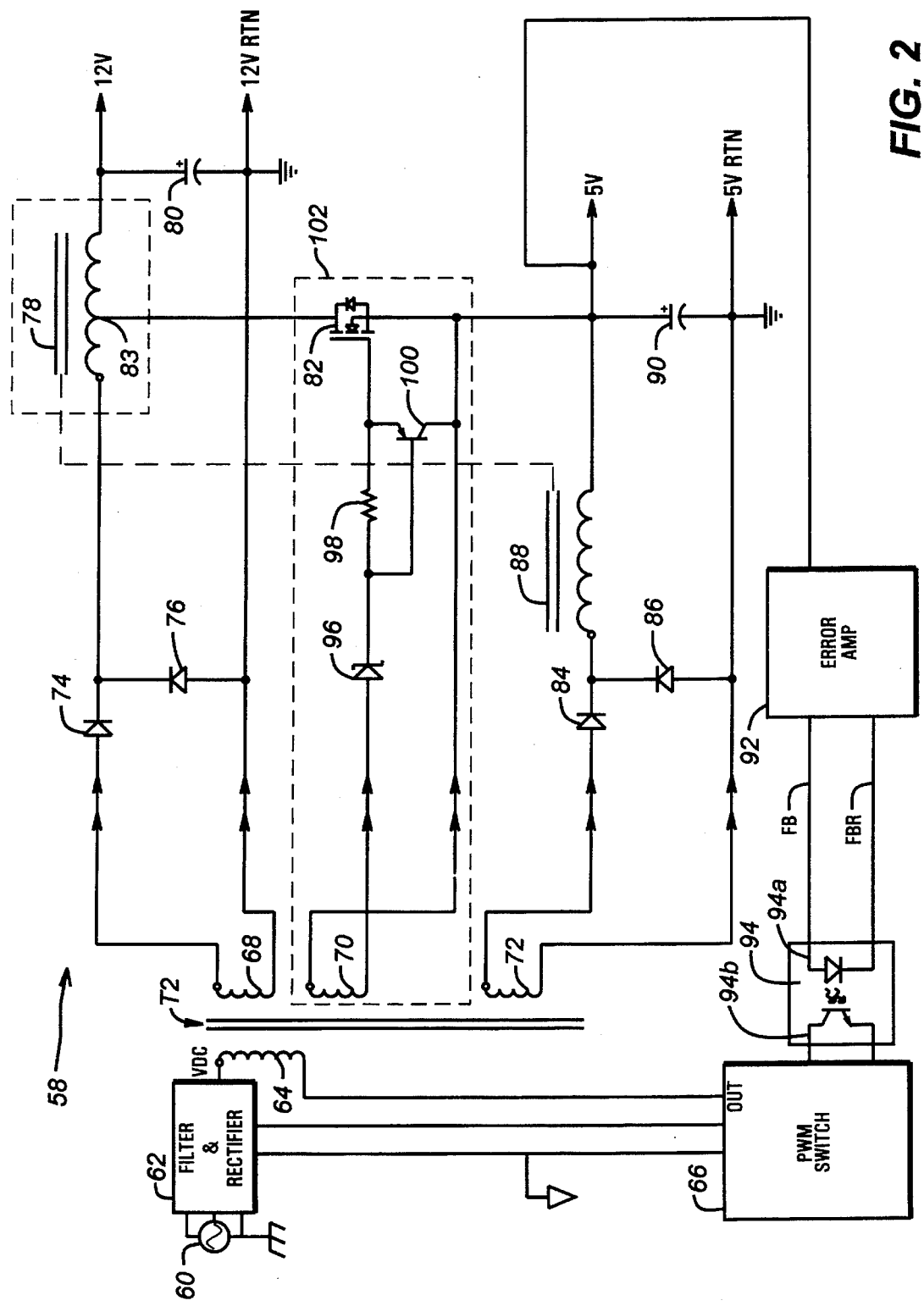
FIG. 2 is a simplified schematic diagram of a power supply according to one embodiment of the present invention.

Referring now to FIG. 2, a schematic diagram is shown illustrating a forward converter switching power supply or regulator 58 according to one embodiment of the present invention. An AC power source 60 has its power, common and ground terminals connected to a filter and rectifier circuit 62, where the ground terminal of the AC power source 60 is preferably coupled to chassis ground of the switching regulator 58. The filter and rectifier circuit 62 converts the AC voltage from the power source 60 to an unregulated DC output voltage, referred to as VDC, which is preferably approximately 390 volts in the preferred embodiment. The VDC signal is provided to the dotted terminal of a primary coil 64 of a converter transformer T2, which is used to transfer power from the primary to the secondary circuit of the switching converter 58. The undotted terminal of the primary coil 64 is coupled to the output of a pulse width modulated (PWM) switch 66, which is used to control current through the primary coil 64 as known to those skilled in the art of switching regulators. The filter and rectifier circuit 62 preferably provides power and ground to the PWM switch 66 as shown.

The transformer T2 of the switching converter 58 preferably includes three secondary coils 68, 70 and 72. The first secondary coil 68 is coupled in a forward converter fashion to provide a 12 volt output, where the dotted terminal of the secondary coil 68 is connected to the anode of a forward diode 74 and where the undotted terminal of the secondary coil is connected to a secondary ground. The secondary ground is connected to a signal referred to as 12 V RTN, which is the return signal for the 12 volt output. The cathode of the diode 74 is connected to the cathode of another forward diode 76, and the anode of the diode 76 is connected to the 12 V RTN signal. The cathodes of the diodes 74 and 76 are coupled to one terminal of a coupled storage inductor 78, which has its opposite terminal providing the output of the 12 volt supply, referred to as 12 V. A load capacitor 80 is coupled between the 12 V and the 12 V RTN signals. It is noted that the secondary coil 68, the diodes 74 and 76, the coupled inductor 78 and the capacitor 80 are analogous to and similar in function as the secondary coil 24, the diodes 26 and 28, the inductor 30 and the capacitor 32 of the regulators shown in FIGS. 1A–1D.

The 5 volt power supply portion comprises the secondary inductor 72 coupled in a forward converter fashion, where its dotted terminal is connected to the anode of a forward diode 84 which has its cathode connected to the cathode of another forward diode 86. The anode of the diode 86 is connected to the undotted terminal of the secondary coil 72, which is also connected to the secondary ground and to the 5 volt return signal, referred to as 5 V RTN. The cathodes of the diodes 84 and 86 are coupled to one terminal of a coupled inductor 88 which has its opposite terminal providing the 5 V signal. In the preferred embodiment, the coupled inductor 88 is wound on the same magnetic core as the coupled inductor 78 of the 12 volt supply, as shown by the dashed line, so that these two inductances are coupled together. In this manner, the voltage across the inductor 78 is controlled by the voltage across the inductor 88. A load capacitor 90 is coupled between the 5 V and the 5 V RTN signals.

As known to those skilled in the art, the 5 volt power supply portion is very tightly regulated through a closed loop to a primary circuit of the switching regulator 58. In this manner, the 5 V signal is provided to an error amplifier 92, which outputs a proportional feedback signal, referred to as FB. The FB signal is coupled to an optocoupler 94, which provides isolation between the primary and secondary portions of the switching converter 58. In particular, the FB signal is preferably coupled to the anode of a light emitting diode (LED) 94a, which is internal to the optocoupler 94, and the cathode of the LED 94a provides a feedback return signal FBR to the error amplifier 92. As known to those skilled in the art, the error amplifier 92 sends current through the LED 94a as determined by the voltage between the 5 V and 5 V RTN signals, where the LED 94a emits light to the base of a transistor 94b within the optocoupler 94. The transistor 94b has its collector and emitter terminals coupled to the PWM switch 64 to complete the feedback loop. In this manner, the PWM switch 66 detects the voltage between the 5 V and 5 V RTN signal through the optocoupler 94, and controls the maximum current through the primary coil 64 to maintain the voltage between the 5 V and 5 V RTN signals within a predetermined voltage range.

The coupled storage inductor 78 has a center tap 83, where the position of the center tap 83 on the inductor 78 is chosen to properly regulate the voltage between the 12 V and 12 V RTN signals to roughly 12 volts. In other words, it is not necessarily tapped at the very center position. An n-channel enhancement metal oxide semiconductor field-effect-transistor (MOSFET) 82 has its source coupled to the center tap 83 of the coupled inductor 78, and its drain coupled to the 5 V signal. The secondary coil 70 has its dotted terminal coupled to the collector of a PNP bi-polar transistor 100, which is also coupled to the source of the MOSFET 82. The emitter of the PNP transistor 100 is coupled to the gate of the MOSFET 82 and also to one side of a resistor 98. The other side of the resistor 98 is coupled to the base of the PNP transistor 100 and also to the cathode of a forward Zener diode 96. The undotted terminal of the secondary coil 70 is coupled to the anode of the Zener diode 96.

The secondary coil 70, the Zener diode 96, the resistor 98, the transistor 100 and the MOSFET 82 serve as a synchronized switch 102. The synchronized switch 102 works in conjunction with the center tapped coupled inductor 78 to implement one embodiment of the present invention. The secondary coil 70 provides the drive current to activate the MOSFET 82 through the Zener diode 96 during the flyback portion of the cycle, which occurs when the PWM switch 66 is turned off. The Zener diode 96 is used rather than a regular diode to protect the MOSFET 82 by limiting the voltage at its gate. The transistor 100 is used to quickly drain the gate capacitance of the MOSFET 82 to turn it off during the forward portion of the cycle, which occurs when the PWM switch 66 is turned on. When the MOSFET 82 is turned off, the resistance between its drain and source terminals is extremely high thereby essentially isolating the 12 V and 5 V signals. The synchronized switch 102, therefore, couples the load and feedback circuit of the 5 volt supply to the center tapped coupled storage inductor 78 during the flyback portion of each cycle, to further regulate the 12 volt supply.

The PWM switch 66 turns on, drawing current through the primary coil 64, which induces current flow out of the dotted terminals of the secondary coils 68 and 72, thereby biasing the diodes 74 and 84 on. The current flows through the coupled storage inductors 78 and 88 to provide power to the 12 volt and 5 volt outputs of the switching converter 58. During this forward portion of the cycle, a negative voltage is applied to the anode of the Zener diode 96 thereby applying a negative voltage to the base of the transistor 100, thereby biasing the transistor 100 on through the resistor 98 which draws current from the gate of the MOSFET 82. This facilitates draining the capacitance at the gate of the MOSFET 82 so that it turns off faster when switching from flyback to forward. The Zener diode 96 is reversed biased and thus off.

When the PWM switch 66 turns off, the secondary coils 68 and 72 reverse voltage, turning off the diodes 74 and 84. The diodes 76 and 86 are biased on, allowing current flow from the secondary coils 68 and 72 into the coupled storage inductors 78 and 88 and the capacitors 80 and 90. The secondary coil 70 provides current from its undotted terminal through the Zener diode 96, which is biased on, through the resistor 98 and into the gate of the MOSFET 82 to turn on the MOSFET 82. The PNP transistor 100 turns off during this flyback portion of the cycle. When the MOSFET transistor 82 is turned on, it provides a very low resistance between its source and drain, thereby coupling the center tap 83 of the coupled inductor 78 to the 5 V signal. In this manner, any excess voltage from the capacitor 80 and excess stored energy in the coupled storage inductor 78 is absorbed through the center tap 83, through the MOSFET 82 and to the load coupled between the 5 V and 5 V RTN signals. Recall that the voltage across the coupled inductor 78 is controlled by the voltage across the coupled inductor 88 to provide further regulation of the voltage between the 12 V and 12 V RTN signals. The location of the center tap 83, the inductance of the inductors 78 and 88, the capacitor 80 and other circuit elements are selected so that the voltage between the 12 V and 12 V RTN signals is regulated at approximately 12 volts when the voltage between the 5 V and 5 V RTN signals is regulated at approximately 5 volts.

Figure 3:
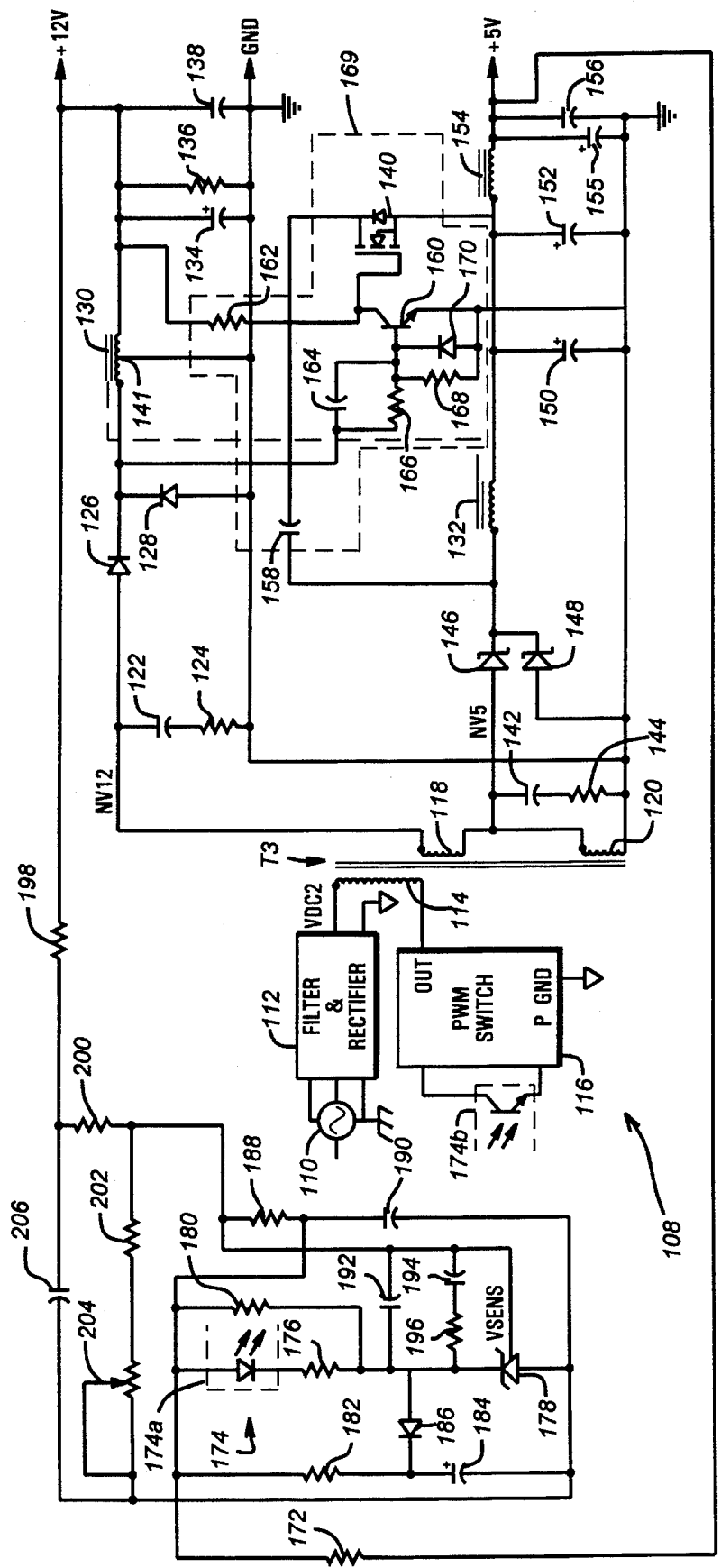
FIG. 3 is schematic diagram of a power supply according to the preferred embodiment of the present invention.

Referring now to FIG. 3, a schematic diagram is shown illustrating a switching converter 108 according to the preferred embodiment of the present invention. An AC power source 110 has its positive, negative and ground terminals coupled to a filter and rectifier circuit 112. The ground terminal of the AC power source 110 is preferably coupled to chassis ground of the switching converter 108. The filter and rectifier circuit 112 provides an unregulated DC voltage, referred to as VDC2, to the dotted terminal of a primary coil 114 of a converter transformer T3. The VDC2 signal is approximately 390 volts in the preferred embodiment. The undotted terminal of the primary coil 114 is connected to the output of a PWM switch 116, which operates in a similar manner as the PWM switch 66.

The transformer T3 preferably has two secondary coils 118 and 120 for providing power to a 12 volt output portion and a 5 volt output portion. An undotted terminal of the secondary coil 120 is preferably coupled to secondary ground, referred to as GND, and the dotted terminal of the secondary coil 120 provides a signal NV5, which is coupled to the undotted terminal of the secondary coil 118. The dotted terminal of the secondary coil 118 provides a signal NV12, which provides power to the 12 volt portion of the switching converter 108. The NV12 signal is coupled to one side of a capacitor 122 and the other side of the capacitor 122 is coupled one side of a resistor 124. The other side of the resistor 124 is coupled to GND. The capacitor 122 and resistor 124 filter the NV12 signal. The NV12 signal is also provided to the anode of a forward diode 126, where the cathode of the diode 126 is coupled to the cathode of another forward diode 128. The anode of the diode 128 is connected to GND. The cathodes of the diodes 126 and 128 are connected to one terminal of a coupled storage inductor 130, which has its opposite terminal providing the output signal, referred to as +12 V, of the 12 volt portion of the switching converter 108. A load capacitor 134, a filter capacitor 138 and a filter resistor 136 are coupled in parallel between the +12 V signal and GND.

In a similar manner as described above, voltage developed across both of the secondary coils 118 and 120 causes current flow through the diode 126 and the coupled storage inductor 130 to provide the output voltage between the +12 V and GND signals. The filter resistor 136 has a relatively large resistance and draws little current. The filter capacitor 138 removes undesirable high frequency signals.

The NV5 signal is coupled to one side of a capacitor 142, and the other side of the capacitor 142 is connected to one side of a filter resistor 144. The other side of the resistor 144 is coupled to GND, where the capacitor 142 and the resistor 144 serve to filter the NV5 signal. The NV5 signal is also connected to the anode of a forward Schottky diode 146, which has its cathode connected to the cathode of another forward Schottky diode 148. Schottky diodes are preferably used since they have a faster switching speed and lower cut-in voltage. The anode of the Schottky diode 148 is connected to GND. The cathodes of the Schottky diodes 146 and 148 are connected to one terminal of a coupled storage inductor 132, which is preferably wound on the same core as the coupled storage inductor 130 as shown by the dashes line. Thus, the voltage across the coupled storage inductor 130 is controlled and limited by the voltage across the coupled storage inductor 132. The opposite terminal of the coupled storage inductor 132 is coupled to the positive sides of two storage capacitors 150 and 152 and also to one end of a filter inductor 154. The other side of the filter inductor 154 provides the output of the 5 volt portion, referred to as +5 V. The other side of the load capacitors 150 and 152 are coupled to GND. Another load capacitor 155 and a filter capacitor 156 are coupled between the +5 V signal and GND. The filter capacitor 156 serves to filter out undesirable high frequency signals. The inductor 154 and the load capacitor 155 are added to improve ripple regulation only, and will be ignored for purposes of the present disclosure.

The coupled storage inductor 130 includes a center tap 141 which is connected to the drain of a n-channel enhancement MOSFET 140 and also to one side of a filter capacitor 158. The other side of the filter capacitor 158 is connected to the cathodes of the Schottky diodes 146 and 148. The source of the MOSFET 140 is coupled to the junction between the coupled storage inductor 132 and the inductor 154, although for practical purposes the source is essentially coupled to the +5 V signal since the inductor 154 may be ignored. The MOSFET 140 is controlled by a transistor circuit comprising an NPN bi-polar transistor 160 which has its collector coupled to the gate of the MOSFET 140 and also to one side of a resistor 162. The other side of resistor 162 is connected to the +12 V signal. The emitter of the transistor 160 is connected to GND. The cathodes of the diodes 126 and 128 are connected to one side of a filter capacitor 164 and to one side of a bias resistor 166, where the other sides of the capacitor 164 and the resistor 166 are connected to the base of the transistor 160. A bias resistor 168 is coupled between the base and emitter of the transistor 160, and a reverse voltage protection diode 170 has its anode connected to the emitter and its cathode connected to the base of the transistor 160.

It is noted that a separate secondary coil of the transformer T3 is not required since the +12 V signal is used to provide power to operate the MOSFET 140. The resistors 162, 166 and 168, the capacitors 158 and 164, the diode 170, the transistor 160 and the MOSFET 140 comprise a synchronized switch 169. The synchronized switch 169 works in conjunction with the center-tapped coupled inductor 130 to implement the preferred embodiment and the present invention. As will be seen below, the synchronized switch 169 couples the center tap 141 to the +5 V signal during the flyback portion, and isolates the center tap 141 and the +5 V signal during the forward portion of the cycle.

During the forward portion of the cycle of the transformer T3, while the PWM switch 116 is turned on, current flows through the secondary coils 118 and 120, biasing the diode 126 and the Schottky diode 146 on, allowing circuit to flow through the coupled storage inductors 130 and 132 to develop the output voltage. Current also flows through the bias resistors 166 and 168 turning on the transistor 160 during the forward portion of the cycle. The gate of the MOSFET 140 is thus coupled to GND through the transistor 160 thereby turning off the MOSFET 140. The transistor 160 operates in a similar manner as the transistor 100 to drain the gate capacitance of the MOSFET 140 for faster switching. Thus, the +12 V and the +5 V signals are isolated from each other during the forward cycle. When the PWM switch 116 turns off causing the flyback portion of the cycle, the transistor 160 is turned off so that the gate of the MOSFET 140 is pulled high through the pull-up resistor 162 to the voltage of the +12 V signal, thus turning on the MOSFET 140. In this manner, during the flyback portion of the switching converter 108, the MOSFET 140 is turned on, drawing excess current, and thus power from the +12 V signal through a portion of the coupled storage inductor 130 through the MOSFET 140 and to the load and feedback circuit coupled to the +5 V signal and GND. It has also been observed that current sharing occurs in the opposite direction, from the +5 V signal to the +12 V signal under reverse loading conditions described more fully below.

As usual, the 5 volt power supply is controlled through a closed loop. The +5 V signal is coupled to one side of a resistor 172, which is preferably a power resistor having a relatively small resistance such as 10 ohms used for short circuit protection. This resistor 172 can thus be ignored for purposes of circuit analysis. The other side of the resistor 172 is connected to the anode of an LED 174a, which is part of an optocoupler 174. The cathode of the LED 174a is connected to one side of a resistor 176, and the other side of the resistor 176 is connected to the cathode of an adjustable precision Zener shunt regulator 178, which is preferably a TL 431C. The anode of the shunt regulator 178 is connected to GND. Another resistor 180 is connected between the anode of the LED 174a and the cathode of the shunt regulator 178 to properly bias the LED 174a. Also, a filter resistor 182 has one side coupled to the anode of the LED 174a and its other side connected to the positive side of a filter capacitor 184. The other side of the capacitor 184 is connected to GND. A reverse protection diode 186 has its anode connected to the cathode of the shunt regulator 178 and its cathode connected to the junction between the capacitor 184 and the resistor 182.

The reference terminal of the shunt regulator 178 is a signal referred to as VSENS. The shunt regulator 178 operates to draw current into its cathode to GND in order to maintain the VSENS signal at some nominal voltage level, which is preferably approximately 2.5 volts. The optocoupler 174 operates in a similar manner as the optocoupler 94, and includes a transistor 174b. The current drawn through the LED 174a provides a feedback signal to the base of the transistor 174b of the optocoupler 174. The transistor 174b has its collector and emitter coupled to the PWM switch 116 to complete the feedback loop. The anode of the LED 174a is also connected to one side of a resistor 188 which has its other side connected to the VSENS signal. The VSENS signal is also provided to one side of a resistor 202, which has its other side connected to one side of a potentiometer 204. The other side of the potentiometer 204 and its control terminal are connected to GND. The potentiometer 204 preferably has a relatively small nominal resistance of about 1 Kohm and is only used for purposes of adjusting the output voltage. It will be ignored for purposes of circuit analysis. Therefore, the +5 V signal is essentially divided through the resistors 188 and 202 to provide the VSENS signal to the shunt regulator 178, which further controls the current through the LED 174a.

Although the +12 V signal is regulated sufficiently with only the circuit elements described above, it has been found that it is also preferable to tie the +12 V signal to the feedback loop since very few additional circuit elements are necessary. In this manner, the +12 V signal is coupled to one end of a power resistor 198 which is similar in function to the resistor 172, and has a relatively small resistance value, such as 10 ohms. The resistor 198 is also ignored for purposes of circuit analysis. The other side of the resistor 198 is connected to one side of a resistor 200 and the other side of the resistor 200 is connected to the VSENS signal. A filter capacitor 206 is coupled between the junction between resistors 198 and 200 and GND. In this manner, the +5 V and the +12 V signals are essentially divided by the resistors 200, 202 and 188 which forms a summing junction to provide the VSENS signal. Thus, the resistors 200, 202 and 188 form a summing junction to sum a proportion of each of the +12 V and the +5 V signals to provide the VSENS signal. The values of the resistors 188 and 202 must be adjusted accordingly. The +5 V signal preferably provides a greater proportion of the VSENS signal in the preferred embodiment, where the +5 V signal provides approximately 65% of the VSENS signal and the +12 V signal provides approximately 35%.

The benefits of the synchronized switch tapped coupled inductor of the present invention can now be appreciated. The extra coil 70 of the transformer T2 adds very little cost and is usually available. The switching converter 108 saves this cost since an extra coil is not necessary. Center-tapping the inductors 78 and 130 adds very little additional cost. The circuit elements including the Zener diode 96, the resistor 98, the transistor 100, the secondary coil 70 and the MOSFET 82 forming the synchronized switch 102 of FIG. 2 are very inexpensive thereby adding little extra cost to the switching converter 58. The switching converter 58 exhibits excellent regulation of both the 12 V and 5 V signals even under light or no load conditions provided to the 12 V signal.

The synchronized switch 169 comprising the capacitors 158 and 164, the resistors 162, 166 and 168, the diode 170, the transistor 160 and the MOSFET 140 are also very inexpensive and can be incorporated into the switching converter 108 at very little extra cost. The +12 V and +5 V signals are regulated well within specifications under all expected load conditions. It has been observed that the synchronized switch 169 draws excess current, and thus power from the +12 V signal to the +5 V signal when the +12 V signal is under little or no load. It is also true that current sharing occurs in the opposite direction when loading conditions are reversed. In particular, when the load between the +5 V signal and GND is relatively light and maximum load appears between the +12 V signal and ground, excess current and power from the +5 V signal is provided to the +12 V signal during the flyback portion through the MOSFET 140. Furthermore, during heavy loading at both outputs, both outputs are regulated well and the synchronized switch 169 has little affect on operation.

Regulation is improved further when the +12 V signal is coupled through the feedback circuit. This is true even under surge conditions. The specification normally allows the +12 V to vary within ±5% under normal conditions and up to ±10% variation during surge conditions. It has been observed that the +12 V signal of the switching regulator 108 remains within 5% specification even under no load or surge conditions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A pulse width modulated forward switching converter, comprising:

means for providing an unregulated DC voltage;

a converter transformer having a primary and a secondary, wherein said primary is coupled to said unregulated DC voltage;

a pulse width modulation switching circuit receiving a feedback signal and coupled to said converter transformer primary for controlling the current through said converter transformer primary based on said feedback signal, wherein said pulse width modulation switching circuit switches on during a forward portion and switches off during a flyback portion of each switching cycle;

a first rectifier and filter circuit coupled to said secondary for providing a first regulated output and including a first coupled storage inductor, for transferring power from said secondary to said coupled storage inductor during said forward portion and for storing energy in said coupled storage inductor during said flyback portion of each cycle;

a feedback circuit coupled to said first output for providing said feedback signal to said PWM switching circuit;

a second rectifier and filter circuit coupled to said converter transformer secondary for providing a second regulated output, said second rectifier and filter circuit including a second coupled storage inductor wherein power is transferred to said second inductor during said forward portion and power is stored in said second inductor during said flyback portion of each cycle, said second coupled storage inductor being electromagnetically coupled to said first coupled storage inductor and further including a center tap terminal;

a switch coupled to said center tap terminal and said first output wherein when said switch is on, said center tap terminal is coupled to said first output and when said switch is off, said center tap terminal and said first output are electrically isolated; and means coupled to said secondary and said switch for turning on said switch during said flyback portion and for turning off said switch during said forward portion of each cycle.

2. The converter of claim 1, wherein said converter transformer secondary includes a plurality of windings, one of said windings being coupled to said first rectifier and filter circuit and a second of said windings being coupled to said second rectifier and filter circuit.

3. The converter of claim 2, wherein said means for turning on and turning off said switch is coupled to a third of said windings.

4. The converter of claim 2, wherein said means for turning on and turning off said switch is coupled to said second winding.

5. A forward switching converter, comprising:

means for providing an unregulated DC voltage;

a converter transformer having a primary and a secondary, wherein said primary is coupled to said unregulated DC voltage;

a pulse width modulated switching circuit receiving a feedback signal and coupled to said converter transformer primary for activating current flow through said converter transformer primary during a forward portion of each cycle based on said feedback signal, and for terminating current flow through said converter transformer primary during a flyback portion of each cycle;

a first forward rectifier circuit coupled to said converter transformer secondary for transferring energy from said converter transformer during said forward portion;

a first inductor capacitor filter having an input and an output, wherein said input is coupled to said first forward rectifier circuit, for receiving and storing energy transferred by said first forward rectifier circuit, said first inductor capacitor filter including a storage inductor coupled to a common core;

a feedback circuit coupled to the output of said first inductor capacitor filter for providing said feedback signal;

a second forward rectifier circuit coupled to said converter transformer secondary for transferring energy from said converter transformer during said forward portion;

a second inductor capacitor filter having an input and an output, wherein said second inductor capacitor filter input is coupled to said second forward rectifier circuit for receiving and storing energy transferred by said second forward rectifier circuit, said second filter including a storage inductor coupled to said common core and including a center tap; and a synchronized switch coupled to said center tap, said first inductor capacitor filter output and said converter transformer secondary, said synchronized switch including:

a switch coupled to said center tap and said first output for coupling said center tap to said first output when said switch is on, and for isolating said first output and said center tap when said switch is off; and means coupled to said secondary and said switch for turning on said switch during said flyback portion and for turning off said switch during said forward portion of each cycle.

6. The converter of claim 5, wherein said converter transformer secondary includes a plurality of windings, one of said windings being coupled to said first forward rectifier circuit and a second of said windings being coupled to said second forward rectifier circuit.

7. The converter of claim 6, wherein said means for turning on and turning off said switch is coupled to a third of said windings.

8. The converter of claim 6, wherein said means for turning on and turning off said switch is coupled to said second winding.

* * * * *